(12) United States Patent
Shin et al.

(10) Patent No.: US 9,606,957 B2
(45) Date of Patent: Mar. 28, 2017

(54) ELECTRONIC DEVICE AND METHOD OF LINKING A TASK THEREOF

(71) Applicant: Samsung Electronics Co., Ltd., Gyeonggi-do (KR)

(72) Inventors: Hokuen Shin, Gyeonggi-do (KR); Hyunkon Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/641,720

(22) Filed: Mar. 9, 2015

(65) Prior Publication Data

US 2015/0309809 A1  Oct. 29, 2015

(30) Foreign Application Priority Data

Apr. 28, 2014 (KR) ........................ 10-2014-0050544

(51) Int. Cl.
| | |
|---|---|
| *G06F 9/455* | (2006.01) |
| *G06F 9/46* | (2006.01) |
| *G06F 15/173* | (2006.01) |
| *G06F 15/02* | (2006.01) |
| *G06F 9/48* | (2006.01) |
| *G06F 9/54* | (2006.01) |
| *G06F 9/50* | (2006.01) |
| *H04L 29/08* | (2006.01) |

(52) U.S. Cl.
CPC .......... *G06F 15/0208* (2013.01); *G06F 9/455* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/50* (2013.01); *G06F 9/505* (2013.01); *G06F 9/5011* (2013.01); *G06F 9/5027* (2013.01); *G06F 9/5033* (2013.01); *G06F 9/5044* (2013.01); *G06F 9/5055* (2013.01); *G06F 9/5083* (2013.01); *G06F 9/5088* (2013.01); *G06F 9/54* (2013.01); *G06F 15/02* (2013.01); *H04L 67/1095* (2013.01)

(58) Field of Classification Search
None
See application file for complete search history.

(56) References Cited

U.S. PATENT DOCUMENTS

| | | | | |
|---|---|---|---|---|
| 2002/0068600 | A1* | 6/2002 | Chihara | .................. H04B 1/385 455/557 |
| 2010/0250824 | A1* | 9/2010 | Belay | .................. G06F 9/45558 711/6 |

(Continued)

FOREIGN PATENT DOCUMENTS

| | | |
|---|---|---|
| KR | 1020130017140 | 2/2013 |
| KR | 1020130090072 | 8/2013 |

*Primary Examiner* — Charles Swift
(74) *Attorney, Agent, or Firm* — The Farrell Law Firm, P.C.

(57) ABSTRACT

A method of linking a task of an electronic device and the electronic device are provided. The method includes determining whether generation of an event satisfying a predetermined condition is detected; selecting another electronic device that is linkable to the electronic device when the generation of the event satisfying the predetermined condition is detected; and generating task environment information of an application and transmitting the task environment information to the other selected electronic device.

20 Claims, 8 Drawing Sheets

(56) References Cited

U.S. PATENT DOCUMENTS

| | | | |
|---|---|---|---|
| 2010/0332658 A1* | 12/2010 | Elyashev | G06F 9/505 709/226 |
| 2011/0126110 A1* | 5/2011 | Vilke | G06F 9/54 715/736 |
| 2012/0324073 A1* | 12/2012 | Dow | G06F 9/5088 709/223 |
| 2013/0040562 A1 | 2/2013 | Song et al. | |
| 2013/0073731 A1* | 3/2013 | Bose | G06F 9/5088 709/226 |
| 2013/0298122 A1* | 11/2013 | Rangegowda | G06F 9/5088 718/1 |
| 2013/0305242 A1* | 11/2013 | Wang | G06F 9/45558 718/1 |
| 2014/0143784 A1* | 5/2014 | Mistry | G06F 15/0208 718/102 |
| 2015/0052254 A1* | 2/2015 | Zhao | H04L 67/101 709/226 |
| 2015/0212840 A1* | 7/2015 | Biran | H04L 47/76 718/1 |
| 2015/0332031 A1* | 11/2015 | Mistry | G06F 21/316 726/19 |

* cited by examiner

ELECTRONIC DEVICE AND METHOD OF LINKING A TASK THEREOF

PRIORITY

This application claims priority under 35 U.S.C. §119(a) to a Korean Patent Application No. 10-2014-0050544, which was filed in the Korean Intellectual Property Office on Apr. 28, 2014, the entire content of which is incorporated herein by reference.

BACKGROUND OF THE INVENTION

1. Field of the Invention

The present invention relates generally to linking tasks between electronic devices, and more particularly, to a method and an electronic device for linking a task that has been executed by electronic device with another electronic device.

2. Description of the Prior Art

Recently, due to developments in communication technology, applications capable of performing various functions have been used in electronic devices including, for example, portable terminals such as a Personal Computers (PCs), smart phones, and home appliances such as a smart TeleVisions (TVs).

Sometimes, an application executed in an electronic device may be linked to another device to execute the same application in the other device. Recently, a task synchronization technique using a cloud server and a cloud address has been widely used. When a user uploads executed contents to a cloud server, the executed contents can be synchronized in various electronic devices through a corresponding address. Thus, a user can successively perform a task in various electronic devices.

When specific resources of an electronic device are limited, (e.g., a limited amount of remaining battery power), it may be difficult to execute a task with a corresponding electronic device. Sometimes, a task executed in a portable electronic device is set to be linked to an electronic device (e.g., a personal computer) to execute the task in the electronic device. Typically, an application must be executed in another electronic device to start a new task. Alternatively, a user must upload corresponding task contents to a cloud server and the task must be synchronized to another electronic device through a corresponding address.

Thus, when a user can not recognize a resource shortage state, or when a user can not take proper measures to address a recognized resource shortage state, it may be difficult for the user to successively perform a task.

SUMMARY OF THE INVENTION

The present invention has been made to address the above problems and disadvantages occurring in the prior art, and to provide at least the advantages set forth below.

Accordingly, an aspect of the present invention provides a method of linking a task and an electronic device thereof.

According to an aspect of the present invention, a method of linking a task of an electronic device is provided. The method includes determining whether generation of an event satisfying a predetermined condition is detected; selecting another electronic device that is linkable to the electronic device when the generation of the event satisfying the predetermined condition is detected; and generating task environment information of an application and transmitting the task environment information to the other selected electronic device.

According to another aspect of the present invention, an electronic device is provided. The electronic device includes a task link control module that determines whether generation of an event satisfying a predetermined condition is detected, selects another electronic device that is linkable to the electronic device through a communication interface, when the generation of the event satisfying the predetermined condition is detected, and generates task environment information of an application and transmits the task environment information to the other selected electronic device through the communication interface; and the communication interface that performs communication with the another electronic device.

According to another aspect of the present invention, a non-transitory computer-readable recording having recorded thereon a program for executing a method for linking a task of an electronic device is provided. The method includes determining whether generation of an event satisfying a predetermined condition is detected; selecting another electronic device that is linkable to the electronic device when the generation of the event satisfying the predetermined condition is detected; and generating task environment information of an application and transmitting the task environment information to the other selected electronic device.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE PRESENT INVENTION

Figure 1:
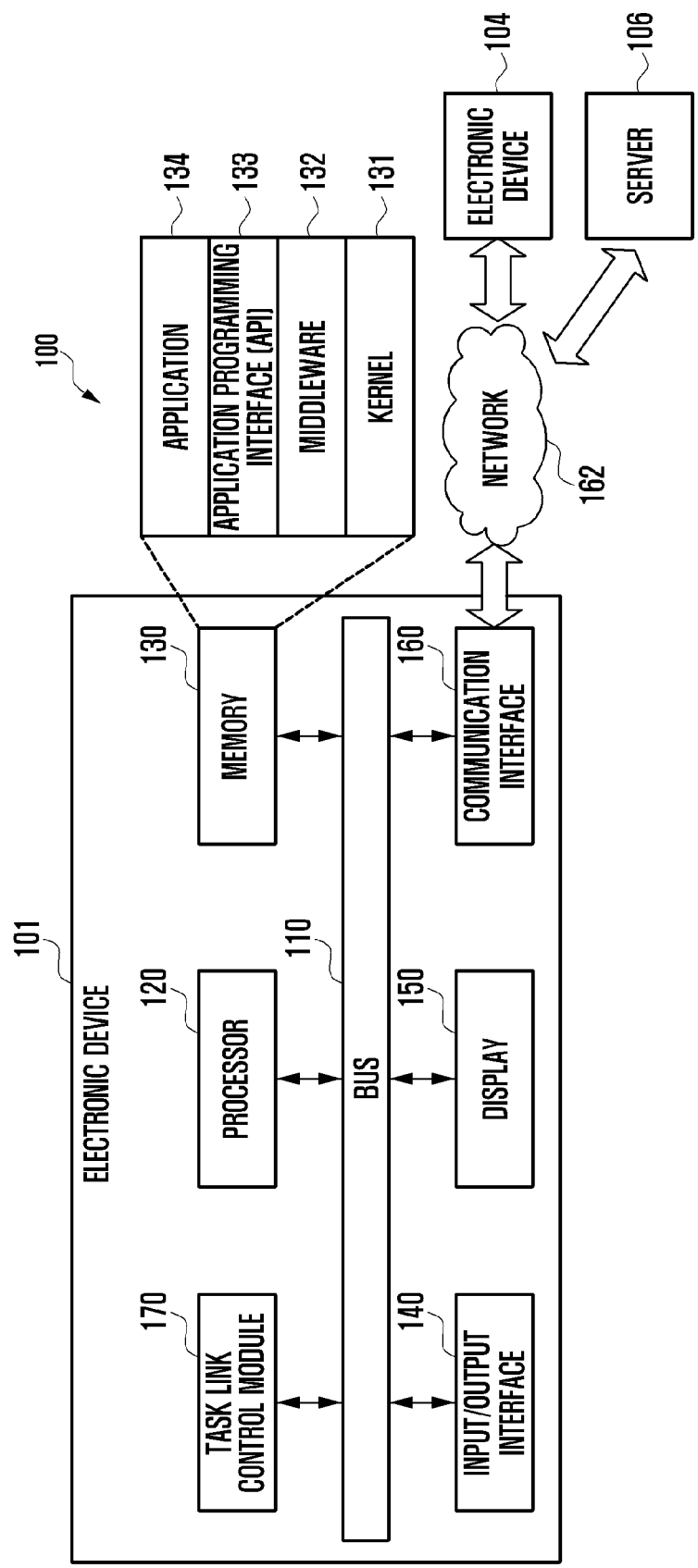
FIG. 1 is a diagram illustrating a network environment including an electronic device according to an embodiment of the present invention.

Hereinafter, embodiments of the present invention are described with reference to the accompanying drawings. In the drawings, the same or similar elements are denoted by the same reference numerals even though they are depicted in different drawings. In the following description, a detailed description of known functions and configurations incorporated herein will be omitted when it may make the subject matter of the present invention less clear for the sake of clarity and conciseness.

While expressions including ordinal numbers, such as "first" and "second", as used herein may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of embodiments of the present invention.

When a component is referred to as being "connected" or "accessed" to any other component, the component may be directly connected or accessed to the other component, but another new component may also be interposed between them. By contrast, when a component is referred to as being "directly connected" or "directly accessed" to any other component, there is no new component between the component and the other component.

The terms as used herein with respect to various embodiments of the present invention are merely for the purpose of describing particular embodiments and are not intended to limit the scope of embodiments of the present invention. Singular forms are intended to include plural forms unless the context clearly indicates otherwise.

Unless defined otherwise, all terms used herein, including technical terms and scientific terms, have the same meaning as commonly understood by a person of ordinary skill in the art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined herein.

An electronic device according to embodiments of the present invention may be a device including a communication function. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an Motion Picture Experts Group (MPEG) Audio Layer 3 (MP3) player, a mobile medical appliance, a camera, and a wearable device (e.g., a Head-Mounted-Device (HMD), such as electronic glasses, electronic clothes, an electronic bracelet, an electronic necklace, an electronic appcessory, electronic tattoos, or a smartwatch).

According to some embodiments of the present invention, the electronic device may be a smart home appliance with a communication function. The smart home appliance as the electronic device, for example, may include at least one of a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HOMESYNC™, APPLE TV™, or GOOGLE TV™), a game console, an electronic dictionary, an electronic key, a camcorder, and an electronic photo frame.

According to some embodiments of the present invention, the electronic devices may include at least one of various medical devices (e.g., Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), an automotive infotainment device, electronic equipment for ships (e.g., ship navigation equipment and a gyrocompass), avionics, security equipment, a vehicle head unit, an industrial or home robot, an Automatic Teller Machine (ATM) of a banking system, and a Point Of Sales (POS) in a shop.

According to some embodiments of the present invention, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to embodiments of the present invention may be a combination of one or more of the aforementioned various devices. Further, the electronic device according to embodiments of the present invention may be a flexible device. Further, the electronic device according to embodiments of the present invention is not limited to the aforementioned devices.

Hereinafter, an electronic device according to various embodiments of the present invention is described with reference to the accompanying drawings. Herein, the term "a user" may refer to any person who uses an electronic device or any other device (e.g., an artificial intelligence electronic device) using an electronic device.

FIG. 1 is a diagram illustrating a network environment 100 including an electronic device 101 according to various embodiments of the present invention.

Referring to FIG. 1, the electronic device 101 includes a bus 110, a processor 120, a memory 130, an input/output interface 140, a display 150, a communication interface 160, and a task link control module 170.

The bus 110 includes a circuit interconnecting the aforementioned components and transmitting communication (e.g., a control message) between the aforementioned components.

The processor 120, for example, receives instructions from the aforementioned components (e.g., the memory 130, the input/output interface 140, the display 150, the communication interface 160, and the task link control module 170) other than the processor 120, through the bus 110, decodes the received instructions, and performs operations or data processing according to the decoded instructions.

The memory 130 stores instructions or data received from or generated by the processor 120 or other components (e.g., the input/output interface 140, the display 150, the communication interface 160, and the task link control module 170). The memory 130 includes programming modules, for example, a kernel 131, middleware 132, an Application Programming Interface (API) 133, and applications 134. Each of the programming modules as described above may be formed by software, firmware, hardware, or a combination of two or more thereof.

The kernel 131 controls or manages system resources (e.g., the bus 110, the processor 120, and the memory 130) used to execute operations or functions implemented in the remaining other programming modules, for example, the middleware 132, the API 133, and the applications 134. Further, the kernel 131 provides an interface that allows the middleware 132, the API 133, or the applications 134 to access and control or manage individual components of the electronic device 101.

The middleware 132 serves to mediate between the API 133 or the applications 134 and the kernel 131, that is, allow the API 133 or the application 134 to communicate and exchange data with the kernel 131. Further, the middleware 132 performs control (e.g., scheduling or load balancing) for task requests received from the applications 134 by using, for example, a method of assigning a priority for use of the system resource (e.g., the bus 110, the processor 120, or the memory 130) of the electronic device 101 to at least one of the applications 134.

The API 133 is an interface for allowing the applications 134 to control functions provided by the kernel 131 and the middleware 132, and includes (not shown) at least one interface or function (e.g., instruction) for, for example, file control, window control, image processing, or text control.

According to various embodiments of the present invention, the applications 134 may include (not shown) a Short Message Service (SMS)/Multimedia Message Service (MMS) application, an e-mail application, a calendar application, an alarm application, a health care application (e.g., an application for measuring the amount of exercise or blood glucose), and an environmental information application (e.g., an application for providing atmospheric pressure information, humidity information, temperature information, etc.). Additionally or alternatively, the applications 134 may also include an application associated with information exchange between the electronic device 101 and an external electronic device (e.g., the electronic device 104). The application associated with information exchange, for example, may include a notification relay application for transferring specific information to the external electronic device or a device management application for managing the external electronic device.

For example, the notification relay application may include a function of transferring notification information, generated in another application of the electronic device 101 (e.g., the SMS/MMS application, the e-mail application, the health care application, or the environmental information application), to an external electronic device (e.g., the electronic device 104). Additionally or alternatively, the notification relay application, for example, may receive notification information from an external electronic device (e.g., the electronic device 104) and provide the received notification information to a user. The device management application, for example, may manage (e.g., install, remove, or update) a function for at least a part of an external electronic device (e.g., the electronic device 104) communicating with the electronic device 101 (e.g., a function of turning on/off an external electronic device itself (or some components thereof) or adjusting the brightness (or resolution) of a display), an application running on the external electronic device, or a service provided in the external electronic device (e.g., a calling or messaging service).

According to various embodiments of the present invention, the applications 134 may include (not shown) an application specified according to the attribute (e.g., type) of an external electronic device (e.g., the electronic device 104). For example, when the external electronic device is an MP3 player, the applications 134 may include an application associated with music playback. Similarly, when the external electronic device is a mobile medical device, the applications 134 may include an application associated with health care. According to an embodiment of the present invention, the applications 134 may include at least one of an application assigned to the electronic device 101 and an application received from an external electronic device (e.g., the server 106 or the electronic device 104).

The input/output interface 140, for example, transfers instructions or data, input from a user through an input/output device (e.g., a sensor, a keyboard, or a touch screen), to the processor 120, the memory 130, the communication interface 160, or the task link control module 170 through the bus 110. For example, the input/output interface 140 may provide the processor 120 with data corresponding to a user's touch input through a touch screen. Further, the input/output interface 140 receives instructions or data from the processor 120, the memory 130, the communication interface 160, or the task link control module 170 through the bus 110 and outputs the received instructions or data through the input/output device (e.g., a speaker or a display). For example, the input/output interface 140 outputs voice data processed by the processor 120 to a user through a speaker.

The display 150 displays various pieces of information (e.g., multimedia data or text data) to a user.

The communication interface 160 establishes communication between the electronic device 101 and an external electronic device (e.g., the electronic device 104 or the server 106). For example, the communication interface 160 is connected to the network 162 through wireless or wired communication and thereby communicates with the external device. The wireless communication, for example, may include at least one of Wireless Fidelity (WiFi), BlueTooth (BT), Near Field Communication (NFC), a Global Positioning System (GPS), and cellular communication (e.g., Long-Term Evolution (LTE), LTE-Advanced (LTE-A), Code Division Multiple Access (CDMA), Wideband Code Division Multiple Access (WCDMA), Universal Mobile Telecommunications System (UMTS), Wireless Broadband (WiBro), or Global System for Mobile communications (GSM)). The wired communication, for example, may include at least one of a Universal Serial Bus (USB), a High Definition Multimedia Interface (HDMI), Recommended Standard 232 (RS-232), and P plain Old Telephone Service (POTS).

According to an embodiment of the present invention, the network 162 may be a telecommunications network. The telecommunications network may include at least one of a computer network, the Internet, the Internet of things, and a telephone network. According to an embodiment of the present invention, a protocol (e.g., a transport layer protocol, a data link layer protocol, or a physical layer protocol) for communication between the electronic device 101 and an external device may be supported by at least one of the applications 134, the application programming interface 133, the middleware 132, the kernel 131, and the communication interface 160.

The task link control module 170 transmits a task, which is being executed in the electronic device 101, to another electronic device (e.g., an electronic device 104), when a predetermined condition is satisfied. The predetermined condition may be, for example, at least one of an initial setting, a reception of an input by a user and a determination of a resource shortage state. The resources refer to resources of a hardware device or a hardware function in the electronic device 101, and a state of the resources refers to a state of the hardware device, a performance of the hardware function, etc. For example, the state of the resources may include a battery state, a data agreement use amount, a telephone signal strength, a network connection state, a remaining memory capacity, a processor speed, a state of a voice signal output device, a state of a screen size, and a state of a usable auxiliary device. A resources shortage state is a state in which the resources are not sufficient to executing a task, and a standard thereof may be set by an initial setting or a setting by a user.

In addition, according to an embodiment of the present invention, when the predetermined condition is satisfied, the task link control module 170 shares desired resources with the other electronic device. For example, data for a monthly data capacity agreement may be exhausted or it may be impossible to establish a network connection. The task link control module 170 shares a use of network resources of the other electronic device. For example, when the resource shortage state occurs in the electronic device 101, the task link control module 170 may active a network tethering function or a Bluetooth function of the other electronic device in order to share the network resources of the other electronic device.

Figure 2:
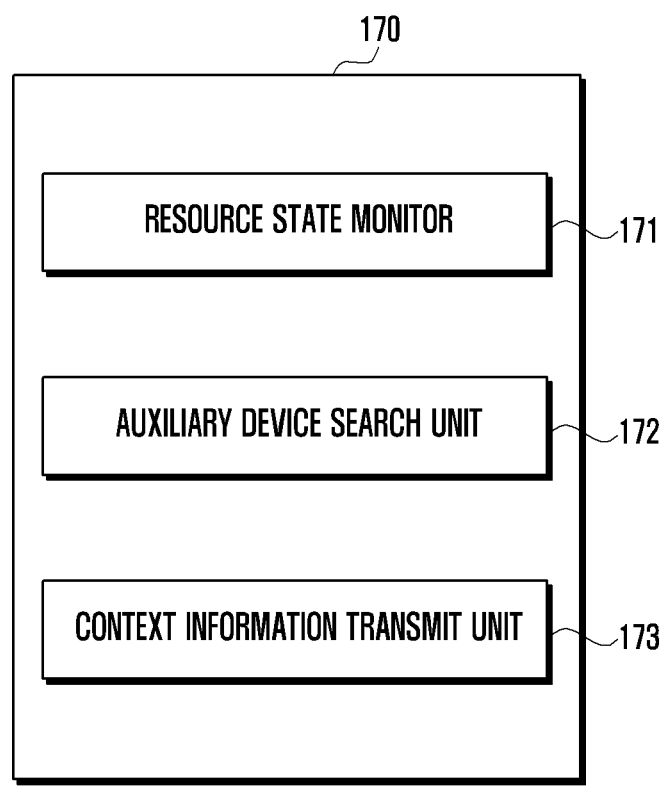
FIG. 2 is a block diagram illustrating an embodiment of a task link control module according to an embodiment of the present invention.

FIG. 2 is a block diagram illustrating an embodiment of a task link control module 170 according to an embodiment of the present invention.

Referring to FIG. 2, the task link control module 170 includes a resource state monitor 171, an auxiliary device search unit 172, and a context information transmit unit 173.

According to an embodiment of the present invention, the resource state monitor 171 monitors states of resources. The resources monitored by the resource state monitor 171 in real time may be set according to initial settings or may be set by a user. The monitored resources may be set regardless of a currently-executed application or the monitored resources may be set in association with the executed application. For example, a battery state, a memory remaining capacity, or the like may be set to be monitored regardless of the executed application. By contrast, a telephone signal strength may be set to be monitored while a call application is executed. An amount of data according to a data use agreement or a network connection state may be set to be monitored while a web browser application is executed. The size of a screen may be set to be monitored while a video playing application is executed. The above-mentioned monitoring resources setting methods are provided examples, and embodiments of the present invention are not limited thereto.

According to an embodiment of the present invention, when the resource state monitor 171 detects a resource shortage state, the resource state monitor 171 transmits detected information to the auxiliary device search unit 172. When the auxiliary device search unit 172 receives the resource shortage state information from the resource state monitor 171, the auxiliary device search unit 172 searches for auxiliary electronic devices through a communication interface 160 and transmits a request to use resources, to the searched electronic device. In addition, when a predetermined condition, such as an initial setting or a user input reception, is satisfied, the auxiliary device search unit 172 searches for the auxiliary electronic devices through the communication interface 160 and transmits the request for to use resources, to the searched electronic device. The auxiliary device search unit 172 searches for the auxiliary electronic devices at an initial time in advance and requests a pairing. The auxiliary device search unit 172 stores information regarding an electronic device that accepts the pairing request, from among the auxiliary electronic devices When the resource shortage state is detected, the auxiliary device search unit 172 directly discovers the stored electronic device.

According to an embodiment of the present invention, the auxiliary device search unit 172 transmits resource shortage information to the searched electronic device, for example, other electronic device 104. The resource shortage information includes information indicating a shortage of at least one resource. At this time, if the other electronic device rejects the request to use the resource, this other electronic device is excluded. When resource state information for a corresponding resource is received from the other searched electronic device 104, and it is determined that the resource state of the other searched electronic device 104 is superior to a monitored resource state, corresponding information is transmitted to the context information transmit unit 173. According to various embodiments of the present invention, there may be a plurality of other searched electronic devices, and therefore, a plurality of resource state information is received. In this case, an electronic device having the most superior resources state is selected and corresponding information is transmitted to the context information transmit unit 173. According to an embodiment of the present invention, the auxiliary device search unit 172 reflects a previous task link history and a statistic of the resources information received from each electronic device to be searched first as a potential electronic device and requests the resources information. An example of data that may be used in exchanging the resources information between electronic devices is shown below.

```
<?xml version="1.0" encoding="UTF-8"?>
<resource_status>
<battery>50</battery>
<signal>80</signal>
<data>50M</data>
<lcd_size>5.3</lcd_size>
<healthcare_support>false</healthcare_support>
</resource_status>
```

According to an embodiment of the present invention, when it is determined that the resource state of the searched electronic device 104 is superior, the context information transmit unit 173 generates context information of the application that is being executed. The context information of the application that is being executed may include task environment information of the application that is being executed. The context information transmit unit 173 transmits the generated context information to the searched electronic device 104 through the communication interface 160. The searched electronic device 104 restores a task environment of a corresponding application using the received context information to execute the corresponding application. Therefore, an application that has been executed in the electronic device having a shortage of resources is executed in the electronic device 104 that has comparatively abundant resources. Thus, a user can successively execute a task of an application. The context information may be generated and transferred (by using eXtensible Markup Language (XML) as set forth below, for example), and predetermined various protocols such as JavaScript Object Notation (JSON) and a byte unit of protocol, between terminals may be used.

```
<?xml version="1.0" encoding="UTF-8"?>
<context_information>
<application_category>Navigation</application_category>
<application_name>Tmap</application_name>
<application_version>1.5</application_version>
<destination_latitude>37.311234</destination_latitude>
<destination_longitude>127.077712</destination_longitude>
```

```
<search_option>freeway_priority</search_option>
</context_information>
```

The electronic device that has received the context information (e.g., the electronic device 104) parses the context information to determine whether the same application exists. When the same application exists, the electronic device executes a corresponding application, and when the same application does not exist, the electronic device links to an application having the same function or a similar category of function.

According to another embodiment of the present invention, when the task link control module 170 detects a task shortage state, the task link control module 170 shares information regarding desired resources with the other electronic device. For example, when a data usage corresponding to a monthly data usage agreement is exhausted or a network connection is impossible, the task link control module 170 shares a use of network resources with the other electronic device. For example, when the above-mentioned resources shortage state occurs in the electronic device 101, the task link control module 170 activates a network tethering function or a Bluetooth function of the other electronic device to share the network resources of the other electronic device.

According to an embodiment of the present invention, an electronic device includes a communication interface 160 that performs a communication connection with the other electronic device 104, and a task link control module 170 that monitors generation of an event satisfying a predetermined condition, when the generation of the event satisfying the predetermined condition is detected, selects the other electronic device 104 through the communication interface 160 generates task environment information regarding an application, and transmits the task environment information to the other selected electronic device through the communication interface 160.

According to an embodiment of the present invention, the task link control module 170 selects the other electronic device 104 through the communication interface 160 when the task link control module 170 detects at least one of a generation of a predetermined event, a reception of an input instructing a task link by a user, and generation of a resource shortage state.

According to an embodiment of the present invention, the task link control module 170 controls a search for at least one other electronic device that is connected through the communication interface 160 when the resource shortage state is detected, transmits resource shortage information to at least one other searched electronic device, and receives resource state information corresponding to the resource shortage information from at least one other searched electronic device.

The task link control module 170 according to an embodiment of the present invention compares the received resource state information with monitored resource state information to determine a superiority of resources, and when the received resource state information is superior to the monitored resource state information, selects an electronic device having the superior resource state information.

According to an embodiment of the present invention, the task link control module 170 selects an electronic device that has been determined to be a reliable electronic device in advance.

According to an embodiment of the present invention, the task link control module 170 sets a priority of the selection using a task link history or statistics of resources information of a plurality of other electronic devices capable of performing a task link. For example, it may be difficult to search for other auxiliary electronic devices and check resource state information of the other electronic devices by the task link control module 170 when resources, such as the amount of remaining battery power, are short. Therefore, the task link control module 170 sets a priority using a past task link history or a statistic of resources information and effectively executes a task link using corresponding priority information.

According to an embodiment of the present invention, the task link control module 170 searches for the other electronic device 104 in advance, requests a pairing to the searched electronic device 104, when the searched electronic device 104 accepts the pairing request, controls storage of corresponding electronic device information in a memory, and when the generation of the event satisfying the predetermined condition is detected, selects the electronic device of which information is stored in the memory.

Figure 3:
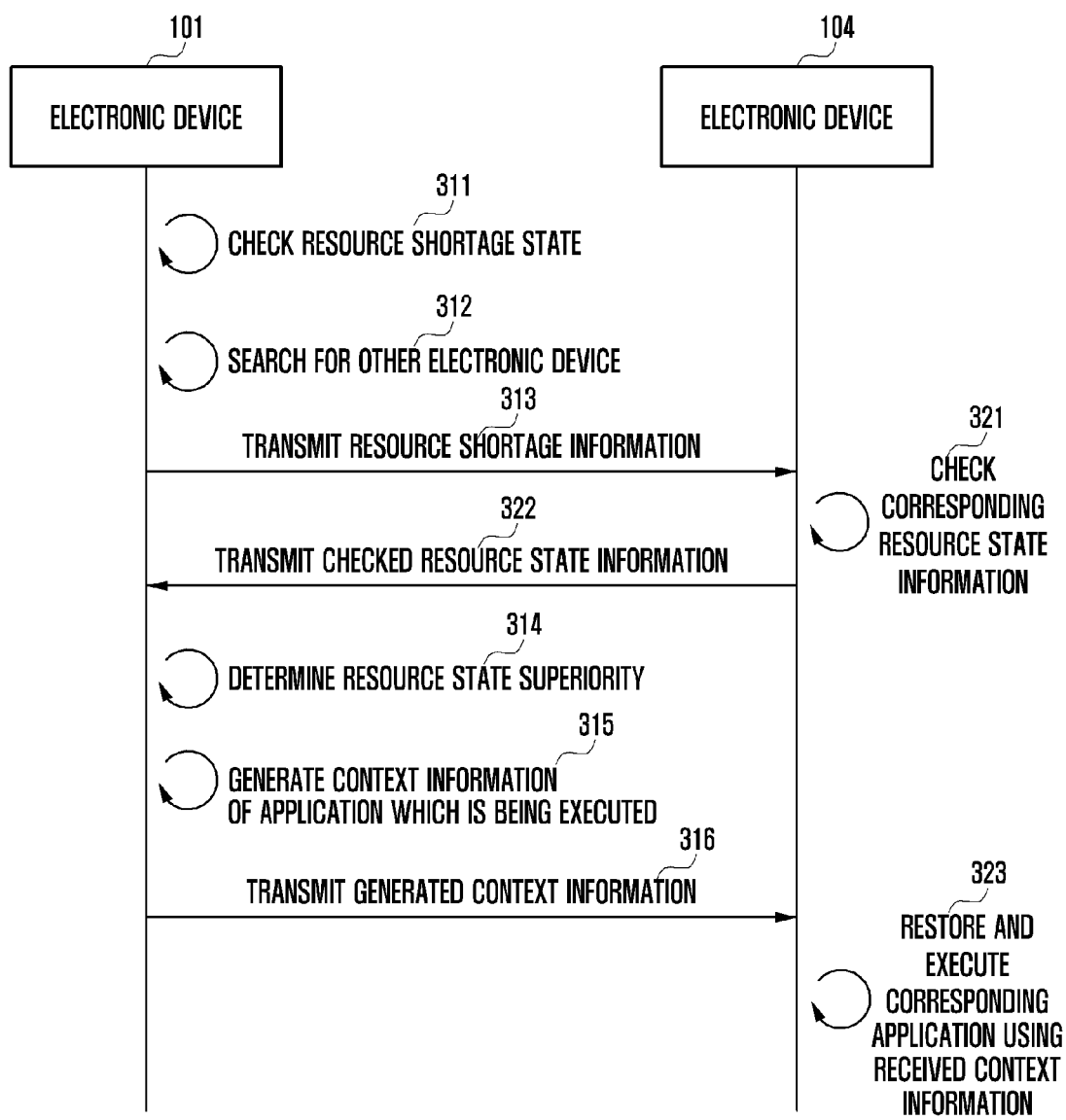
FIG. 3 is a diagram illustrating a method of linking a task of an electronic device according to an embodiment of the present invention.

According to an embodiment of the present invention, a state of resources includes at least one of a battery state, an amount of data according to a datause agreement, a telephone signal strength, a network connection state, a memory remaining capacity, a processor speed, a state of a voice signal output device, a state of a screen size, and a state of a usable auxiliary device. FIG. 3 is a diagram schematically illustrating a method of linking a task of an electronic device according to an embodiment of the present invention.

Referring to FIG. 3, according to an embodiment of the present invention, in step 311 an electronic device 101 determines whether there is a resource shortage state while the electronic device 101 executes an application to perform a predetermined task. When there is a determination that there is a resource shortage state, in step 312, the electronic device 101 searches for another electronic device 104. The search for the other electronic device 104 is performed in a method of searching for an auxiliary electronic device connected through wireless or wired communication. The wireless communication may include, for example, at least one of WiFi, BT, NFC, GPS and a cellular communication (e.g, LTE, LTE-A, CDMA, WCDMA, UMTS, WiBro, GSM, etc.). The wire communication may include, for example, at least one of a USB, HDMI, RS-232 and POTS. In addition, as described above, the electronic device 101 may search for the other electronic device 104 in a method of checking another electronic device that has been determined to be a reliable electronic device in advance. For example, a portable terminal that is registered as a family possession, an electronic device of a specific model name, and an electronic device which satisfies a specific condition at a specific time may be determined to be reliable electronic device by the electronic device 101. In addition, the reliable electronic device may be an electronic device that accepted a pairing with the electronic device 101 in advance. In step 313, the electronic device 101 transmits information regarding the shortage of resources the other searched electronic device 104.

According to an embodiment of the present invention, in step 321, the other searched electronic device 104 checks resource state information of resources corresponding to the information regarding the shortage of resources. In step 322, the checked resource state information may be transmitted to the electronic device 101. For example, when the other searched electronic device 104 is set as a reliable electronic device, when the other electronic device 104 is authenticated, the other electronic device 104 transmits the checked resource state information to the electronic device 101. For example, when the other searched other electronic device 104 performs a pairing in advance, when the other electronic device 104 is determined to be an authenticated paired electronic device, the other electronic device 104 transmits the checked resource state information to the electronic device 101. According to another embodiment of the present invention, the electronic device 101 transmits a resource state check request to a plurality of other electronic devices. Each of the plurality of the electronic devices checks predetermined resource state information transmits the checked resource state information to the electronic device 101. The electronic device 101 generally compares at least one of the resource state information received from the plurality of other electronic devices 104 to set a priority between the other electronic devices 104.

According to an embodiment of the present invention, in step 314, the electronic device 101 receives the resource state information from the other searched electronic device 104 and determines a superiority of resources by comparing the resource state information of the other electronic device 104 with monitored resource state information of the electronic device 101. When the electronic device 101 determines that the received resource state information is superior to the monitored resource state information, in step 315, the electronic device 101 generates context information of an application to be transferred. According to another embodiment of the present invention, when the resource shortage state is checked, the electronic device 101 may preferentially generate context information of an application which is being executed. In step 316, the generated context information is transmitted to the searched electronic device 104. When the resource state information is received from the plurality of other electronic devices 104, respectively, when it is determined that the resource state information of at least one other electronic device 104 is superior to the monitored resource state information, the context information may be transmitted to a corresponding electronic device. According to an embodiment of the present invention, when it is determined that resource state information of a plurality of other electronic devices 104 is superior to the monitored resource state information, the context information of the application, which is to be transferred, is transmitted to an electronic device having the most superior resource state information. The context information of the application refers to task environment information. The context information is generated and transferred (such as through XML, for example), and predetermined various protocols such as JSON and a byte unit of protocol, between terminals may be used. In step 323, the other electronic device 104 restores a task environment of a corresponding application using the received context information. For example, the electronic device 104 parses the context information to determine whether the same application exists in both electronic devices. When the same application exists, the other electronic device 104 executes a corresponding application, and when the same application does not exist, the other electronic device 104 may link to an application having the same function of a similar category. For example, when the same application does not exist, the other electronic device 104 may link to an application having the most conformity, from among compatible applications.

Figure 4:
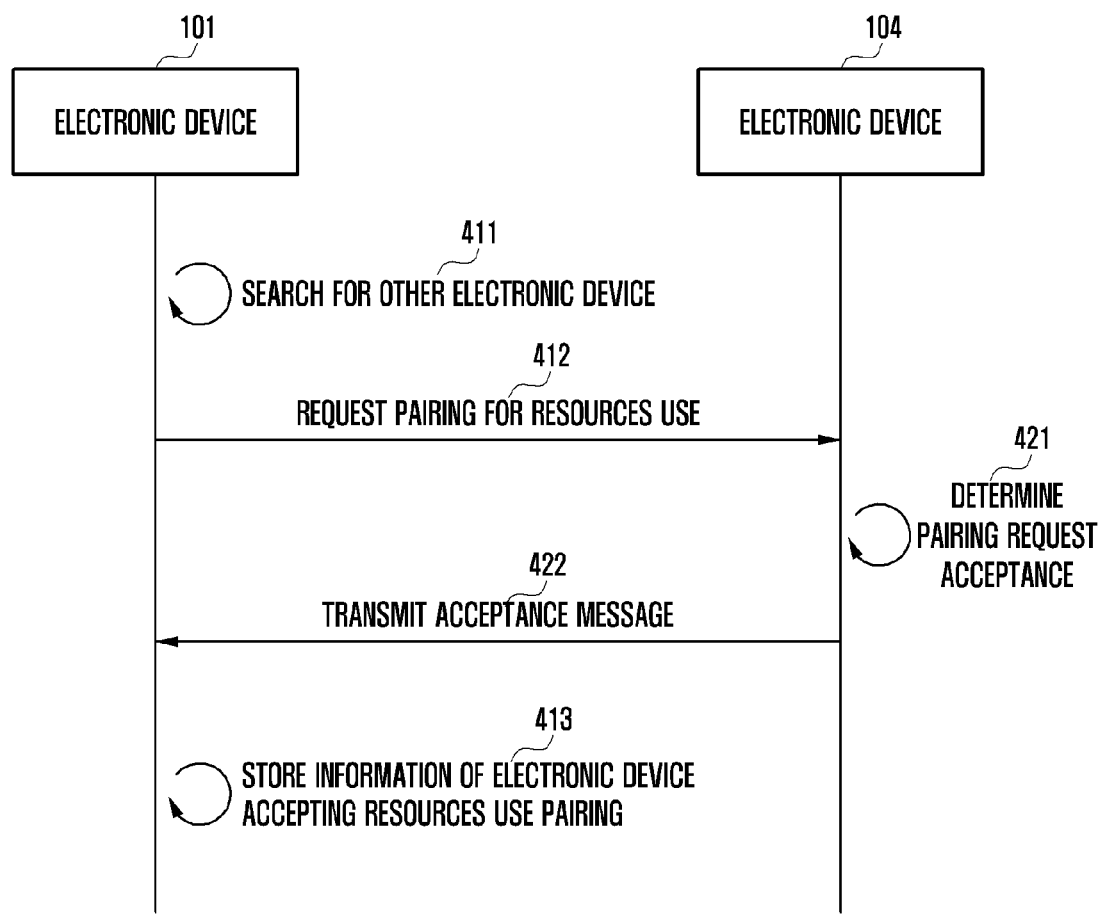
FIG. 4 is a diagram illustrating a predetermined pairing operation of an electronic device according to an embodiment of the present invention.

FIG. 4 is a diagram illustrating a predetermined pairing operation of an electronic device 101 according to an embodiment of the present invention.

Referring to FIG. 4, according to an embodiment of the present invention, in step 411, the electronic device 101 searches for another electronic device through a communication interface 160. In step 412, the electronic device 101 transmits a pairing request for usage of resources to the other searched electronic device 104.

In step 421, the other electronic device 104, upon receiving the pairing request, determines whether to accept the pairing request. When the other electronic device 104 accepts the pairing request, in step 422, the other electronic device 104 transmits a pairing request acceptance message to the electronic device 101.

In step 413, the electronic device 101 store information of the electronic device accepting the resources use pairing. The stored electronic device may also be referred to as a paired electronic device herein. When the electronic device 101 detects a resource shortage state and a request to use resources of an auxiliary electronic device is necessary, the electronic device 101 directly checks the paired electronic device and sends a request for resources to a corresponding electronic device.

Figure 5:
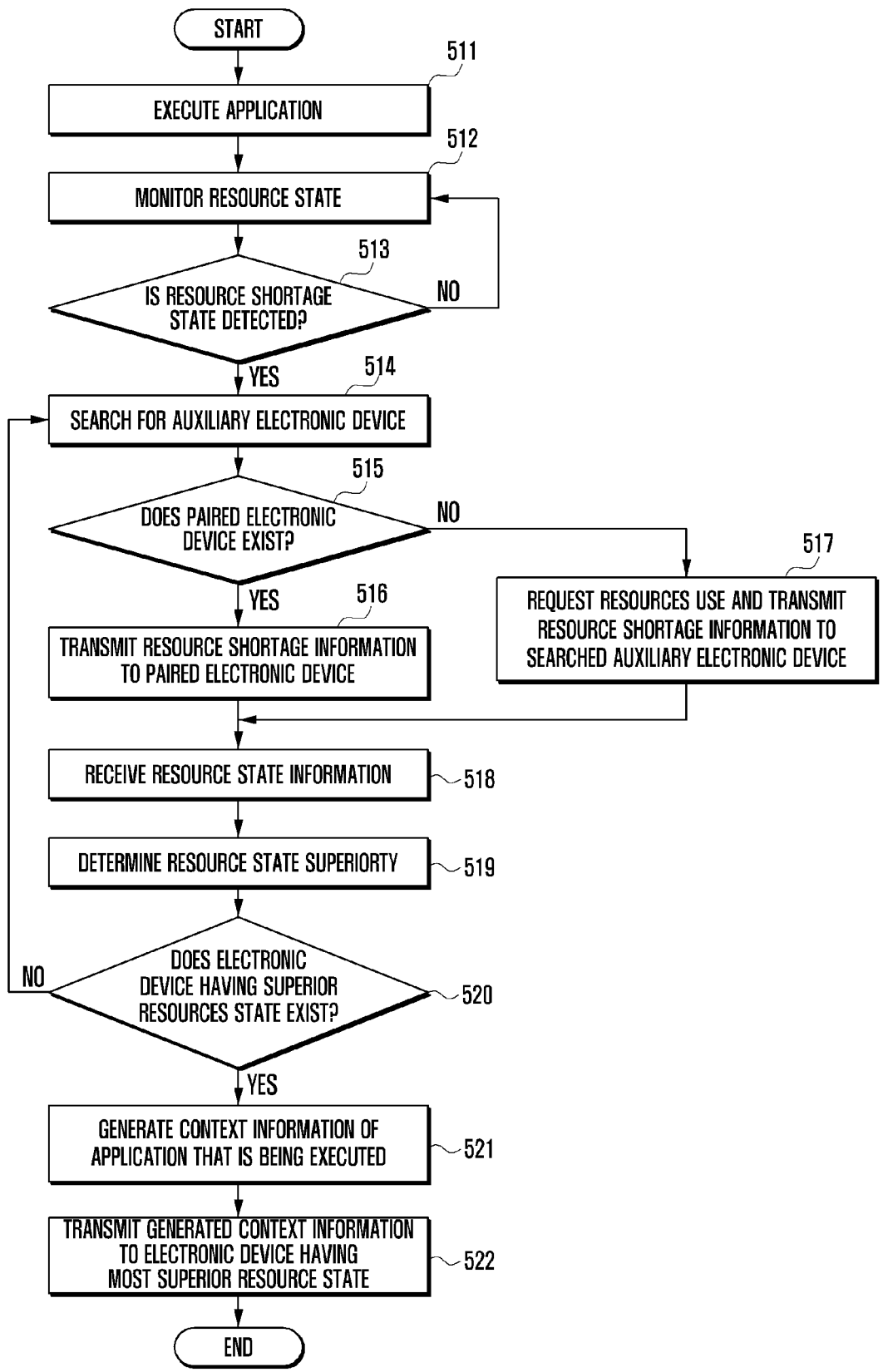
FIG. 5 is a flowchart illustrating a method of linking a task of an electronic device according to an embodiment of the present invention.

FIG. 5 is a flowchart illustrating a method of linking a task of an electronic device 101 according to an embodiment of the present invention.

Referring to FIG. 5, according to an embodiment of the present invention, in step 511, an electronic device 101 performs a predetermined task in an executed application. In step 512, the electronic device 101 monitors a state of resources of the electronic device 101. In step 513, when the electronic device 101 detects a resource shortage state for specific resources, in step 514, the electronic device 101 searches for an auxiliary electronic device. According to an embodiment of the present invention, in step 515, the electronic device 101 determines whether a paired electronic device exists, and when the paired electronic device exists, in step 516, the electronic device 101 transmits resource shortage information to the paired electronic device. When the paired electronic device does not exist, in step 517, the electronic device 101 transmits the resource shortage information to the searched auxiliary electronic device to request usage of resources.

According to an embodiment of the present invention, when the paired electronic device or the searched auxiliary electronic device accepts the resource use request and transmits resource state information for resources experiencing a shortage, in step 518, the electronic device 101 receives the resource state information, and in step 519, the electronic device 101 compares the received resource state information with monitored resource state information, to determine which resource state information is superior. The resource state information of the searched auxiliary electronic device may include resources of at least one of the third auxiliary electronic devices paired with a corresponding electronic device, as well as the resources of the auxiliary electronic device, but embodiments of the present invention are not limited thereto. As a result of the determination, in step 520, when resource state information superior to the monitored resource state information does not exist, in step 514, the electronic device 101 searches for an auxiliary electronic device again. When resource state information superior to the monitored resource state information exists, in step 521, the electronic device generates context information of the executed application.

According to an embodiment of the present invention, the electronic device 101 transmits the generated context information to an auxiliary electronic device having the most superior resource state. After the context information is transmitted, the electronic device 101 automatically ends execution of a corresponding application.

Figure 6:
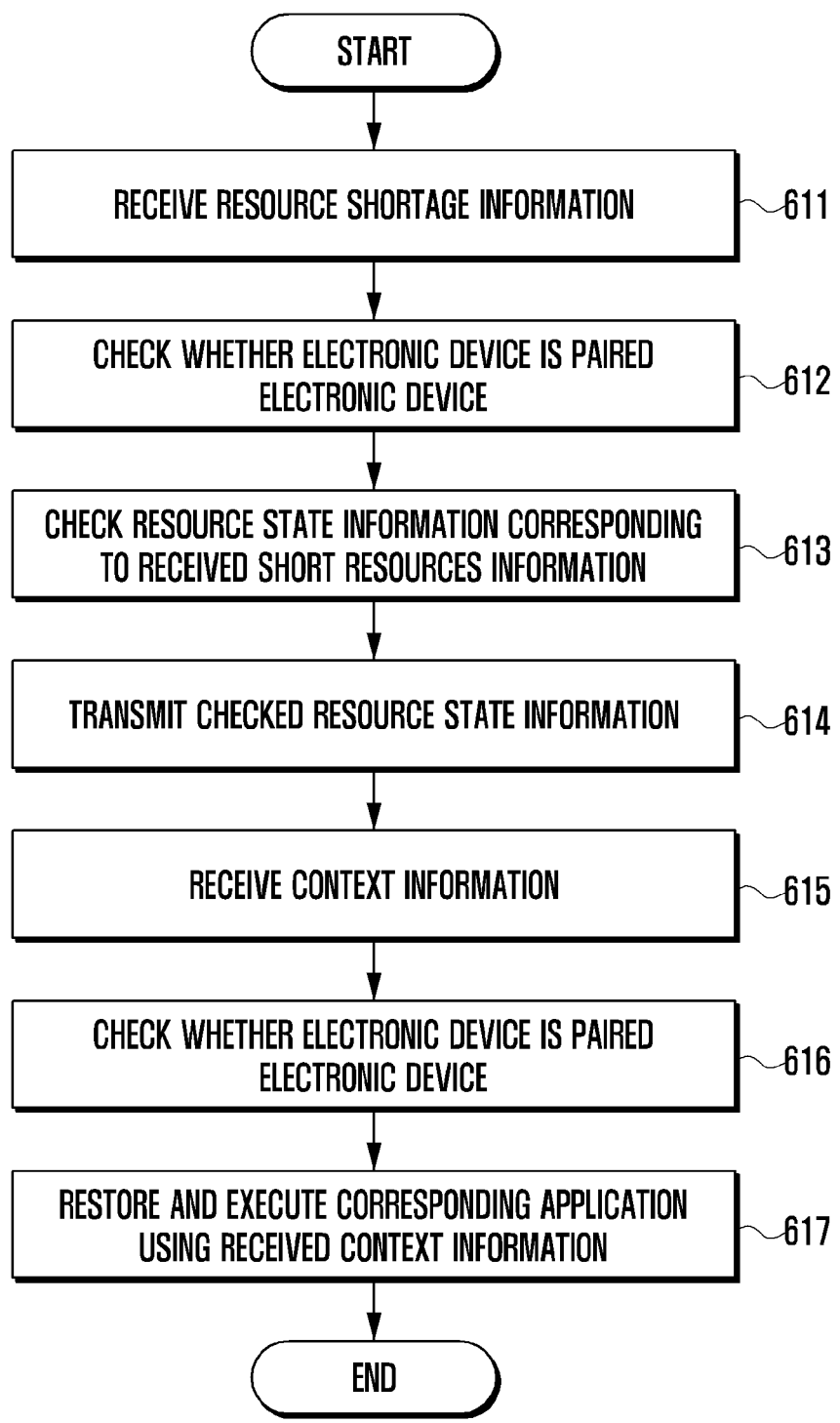
FIG. 6 is a flowchart illustrating a method of linking a task of other electronic device according to an embodiment of the present invention.

FIG. 6 is a flowchart illustrating a method of linking a task of another paired electronic device according to an embodiment of the present invention.

Referring to FIG. 6, according to an embodiment of the present invention, in step 611, the other paired electronic device 104 receives information regarding a shortage of resources from an electronic device 101. In step 612, for security, the electronic device 101 determines whether the other electronic device is a paired electronic device. When it is determined that the other electronic device 104 is a paired electronic device, in step 613, the other electronic device 104 checks resource state information of resources corresponding to the received resource shortage information. In step 614, the other electronic device 104 transmits the checked resource state information to the electronic device 101.

According to an embodiment of the present invention, when the electronic device 101 determines that a resource state of the other electronic device 104 is superior, in step 615, the other electronic device 104 receives context information of an application from the electronic device 101. The context information includes context information of an application that is currently executed for a link of an executed task. In step 616, for security, the other electronic device 104 re-checks whether the electronic device 101 is a paired electronic device. The check operation is not essential, and therefore, may be selectively performed according to embodiments of the present invention. When it is determined that the electronic device 101 is a paired electronic device, in step 617, the other electronic device 104 restores a task environment of a corresponding application using the received context information to execute the corresponding application. According to the present embodiment of the present invention, a user can successively perform the corresponding task in the auxiliary electronic device 104 having comparatively abundant resources instead of the electronic device 101, which does not have sufficient resources to perform the task.

According to an embodiment of the present invention, a method of linking a task of an electronic device includes monitoring for generation of an event satisfying a predetermined condition. When the generation of the event satisfying the predetermined condition is detected, another electronic device that is linkable to the electronic device is selected, task environment information of an application is generated, and the task environment information is transmitted to the other selected electronic device.

According to an embodiment of the present invention, the generation of the event satisfying the predetermined condition includes at least one of a generation of a predetermined event, reception of an input instructing a task link by a user, and a generation of resource shortage state.

According to an embodiment of the present invention, the selection of the other electronic device according to an embodiment includes, when the resource shortage state is detected, searching for at least one other electronic device that is connected through a network, transmitting resource shortage resource information to at least one other searched electronic device, and receiving resource state information corresponding to the resource shortage information from at least one other searched electronic device.

According to an embodiment of the present invention, the selection of the other electronic device further includes comparing the received resource state information with monitored resource state information to determine a superiority of resources.

According to an embodiment of the present invention, the selection of the other electronic device includes selecting an electronic device having the most superior resource state information, when the received resource state information is superior to the monitored resource state information.

According to an embodiment of the present invention, the selection of the other electronic device includes selecting an electronic device that has been predetermined to be a reliable electronic device.

According to an embodiment of the present invention, the selection of the other electronic device further includes setting a priority of the selection using a task link history or statistics of resource information of a plurality of other electronic devices capable of a task link.

According to an embodiment of the present invention, the method further includes searching for other electronic devices in advance, requesting a pairing to the searched electronic device, and storing corresponding electronic device information, when the searched electronic device accepts the pairing request.

According to an embodiment of the present invention, the selection of the other electronic device includes selecting the paired electronic device.

According to an embodiment of the present invention, the method further includes monitoring a state of resources, which may include determining resources monitored according to an executed application.

According to an embodiment of the present invention, the state of the resources may include at least one of a battery state, a data agreement use amount, a telephone signal strength, a network connection state, a memory remaining capacity, a processor speed, a state of a voice signal output device, a state of a screen size, and a state of a usable auxiliary device.

Figure 7:
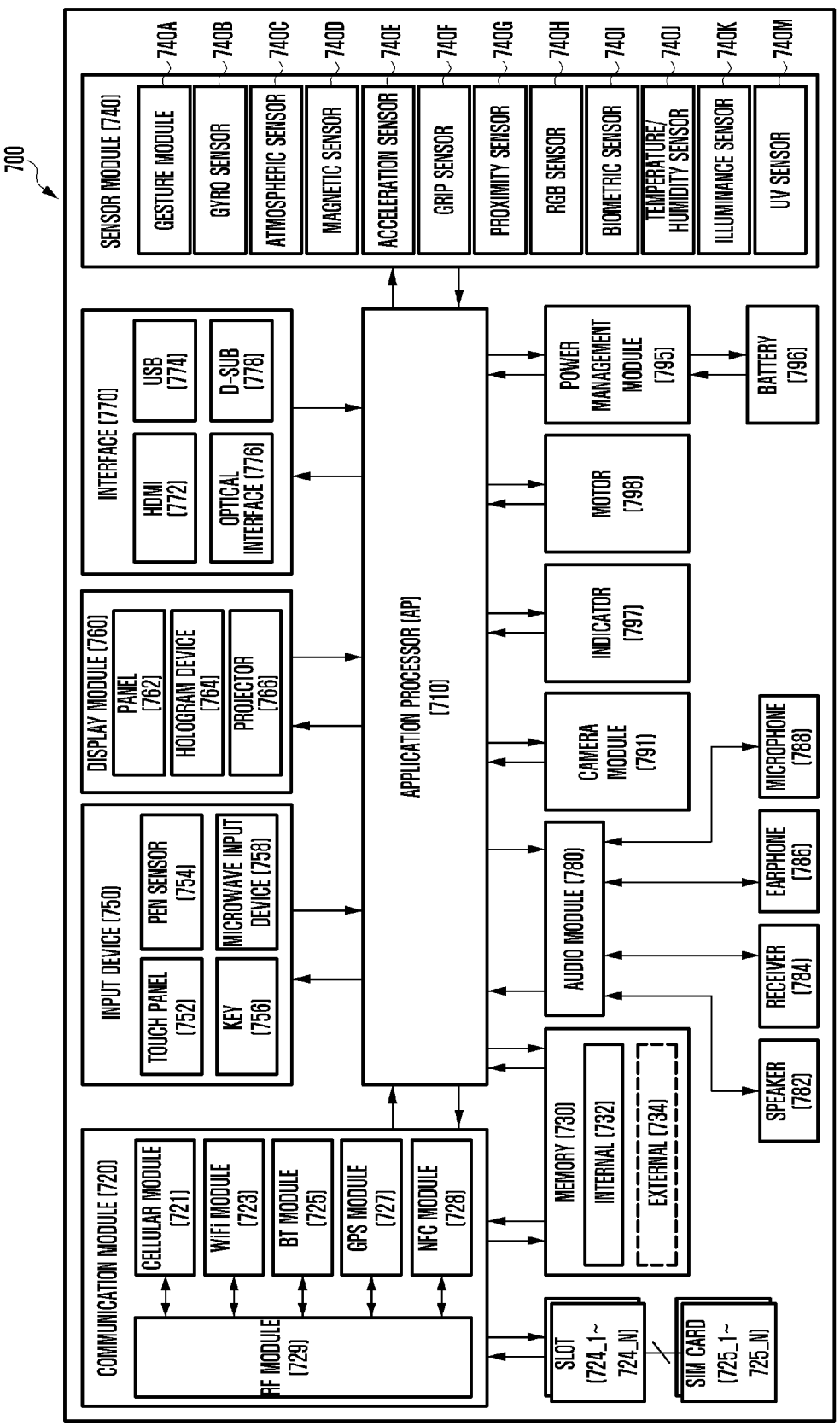
FIG. 7 is a block diagram illustrating an electronic device according to an embodiment of the present invention.

FIG. 7 is block diagram illustrating an electronic device according to an embodiment of the present invention. The electronic device 700, for example, may include all or a part of the electronic device 101 shown in FIG. 1.

Referring to FIG. 7, the electronic device 700 includes at least one Application Processor (AP) 710, a communication module 720, at least one Subscriber Identity Module (SIM) card slots 724_1-724_N, a memory 730, a sensor module 740, an input module 750, a display 760, an interface 770, an audio module 780, a camera module 791, a power management module 795, a battery 796, an indicator 797, and a motor 798.

The AP 710 drives an operating system or an application program to control a plurality of hardware or software components connected to the AP 710, and perform processing and operations with respect to various data including multimedia data. The AP 710, for example, may be implemented as a System on Chip (SoC). According to an embodiment of the present invention, the AP 710 further includes a Graphic Processing Unit (GPU) (not shown).

The communication module 720 (e.g., the communication interface 160 of FIG. 1) performs data transmission/reception in communication with other electronic devices (e.g., the electronic device 104 and the server 106) connected to the electronic device 700 (e.g., the electronic device 101) through a network. According to an embodiment of the present invention, the communication module 720 includes a cellular module 721, a WiFi module 723, a BT module 725, a GPS module 727, an NFC module 728, and a Radio Frequency (RF) module 729.

The cellular module 721 provide a voice call, a video call, an SMS service, an Internet service, and the like through a communication network (e.g., LTE, LTE-A, CDMA, WCDMA, UMTS, WiBro, or GSM). The cellular module 721 may also identify and authenticate an electronic device in a communication network by using, for example, a SIM (e.g., a SIM card). According to an embodiment of the present invention, the cellular module 721 performs at least some of the functions that can be provided by the AP 710. For example, the cellular module 721 may perform at least a multimedia control function.

According to an embodiment of the present invention, the cellular module 721 includes a Communication Processor (CP) (not shown). Further, the cellular module 721, for example, may be implemented as an SoC. Although the cellular module 721 (e.g., a CP), the memory 730, the power management module 795, and the like are shown as separate elements from the AP 710 in FIG. 7, the AP 710 may be implemented to include at least some (e.g., the cellular module 721) of the aforementioned elements, according to an embodiment of the present invention.

According to an embodiment of the present invention, the AP 710 or the cellular module 721 (e.g., a CP) loads a command or data received from at least one of a non-volatile memory and other elements connected thereto into a volatile memory and process the loaded command or data. Further, the AP 710 or the cellular module 721 stores data received from or generated by at least one of other elements in a non-volatile memory.

Each of the WiFi module 723, the BT module 725, the GPS module 727, and the NFC module 728, for example, may include a processor for processing data transmitted or received through the corresponding module. Although the cellular module 721, the WiFi module 723, the BT module 725, the GPS module 727, and the NFC module 728 are shown as separate blocks in FIG. 7, some of these components may be included in one Integrated Chip (IC) or one IC package, according to an embodiment of the present invention. For example, at least some of processors corresponding to the cellular module 721, the WiFi module 723, the BT module 725, the GPS module 727, and the NFC module 728 respectively (e.g., a CP corresponding to the cellular module 721 and a WiFi processor corresponding to the WiFi module 723) may be implemented as one SoC.

The RF module 729 performs data transmission/reception, such as RF signal transmission/reception. Although not shown in the drawing, the RF module 729, for example, may include a transceiver, a Power Amp Module (PAM), a frequency filter, a Low Noise Amplifier (LNA), etc. The RF module 729 may further include a component for transmitting/receiving an electromagnetic wave over the air in wireless communication, such as a conductor or a conducting wire. Although according to the example of FIG. 7, the cellular module 721, the WiFi module 723, the BT module 725, the GPS module 727, and the NFC module 728 share one RF module 729, at least one of the cellular module 721, the WiFi module 723, the BT module 725, the GPS module 757, and the NFC module 728 may perform RF signal transmission/reception through a separate RF module according to an embodiment of the present invention.

The at least one SIM card 725_1 to 725_N may be a card that includes a SIM, and may be inserted into at least one slot 724_1 to 724_N formed in a certain position of the electronic device. The at least one SIM card 725_1 to 725_N includes unique identification information (e.g., integrated circuit card identifier (ICCID)) or subscriber information (e.g., international mobile subscriber identity (IMSI)).

The memory 730 (e.g., the memory 130 of FIG. 1) includes at least one of an internal memory 732 or an external memory 734. The internal memory 732, for example, may include at least one of a volatile memory (e.g., a Dynamic RAM (DRAM), a Static RAM (SRAM), or a Synchronous Dynamic RAM (SDRAM)) and a non-volatile memory (e.g., a One-Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, or a NOR flash memory).

According to an embodiment of the present invention, the internal memory 732 may be a Solid State Drive (SSD). The external memory 734 may further include a flash drive (e.g., a Compact Flash (CF), a Secure Digital (SD), a Micro Secure Digital (Micro-SD), a Mini Secure Digital (Mini-SD), an eXtreme Digital (xD), or a memory stick). The external memory 734 may be functionally connected to the electronic device 700 through various interfaces. According to an embodiment of the present invention, the electronic device 700 may further include a storage device (or storage medium) such as a hard drive.

The sensor module 740 measures a physical quantity or detects an operation state of the electronic device 700 and converts the measured or detected information into an electronic signal. The sensor module 740, for example, may include at least one of a gesture sensor 740A, a gyro sensor 740B, an atmospheric pressure sensor 740C, a magnetic sensor 740D, an acceleration sensor 740E, a grip sensor 740F, a proximity sensor 740G, a color sensor 740H (e.g., a Red, Green, and Blue (RGB) sensor), a biometric sensor 740I, a temperature/humidity sensor 740J, a light sensor 740K, and a UltraViolet (UV) sensor 740M. Additionally or alternatively, the sensor module 740, for example, may include an E-nose sensor (not shown), an ElectroMyoGraphy (EMG) sensor (not shown), an ElectroEncephaloGram (EEG) sensor (not shown), an ElectroCardioGram (ECG) sensor (not shown), an InfraRed (IR) sensor (not shown), an iris scanner (not shown), and/or a fingerprint sensor (not shown). The sensor module 740 may further include a control circuit for controlling one or more sensors included therein.

The input module 750 may include a touch panel 752, a (digital) pen sensor 754, a key 756, or an ultrasonic input unit 758. The touch panel 752, which recognizes a touch input, for example, may include (not shown) at least one of a capacitive touch panel, a resistive touch panel, an infrared touch panel, and an acoustic wave touch panel. Also, the touch panel 752 may further include a control circuit. When the touch panel 752 is a capacitive touch panel, the touch panel 752 may recognize a physical contact or proximity to the touch panel 752. The touch panel 752 may also further include a tactile layer (not shown). When the touch panel 752 includes a tactile layer, the touch panel 752 provides a tactile response to a user.

The (digital) pen sensor 754 may be implemented, for example, in a manner similar to that used for receiving a touch input from a user or by using a separate recognition sheet. The key 756 may include, for example, a physical button, an optical key, or a keypad. The ultrasonic input unit 758 identifies data by generating an ultrasonic signal through an input tool and detects a sonic wave through a microphone (e.g., the microphone 688) in the electronic device 600, and is capable of wireless recognition. According to an embodiment of the present invention, the electronic device 700 also receives user input from an external device (e.g., a computer or server) connected thereto by using the communication module 720.

The display 760 (e.g., the display 150 of FIG. 1) may include a panel 762, a hologram unit 764, or a projector 766. The panel 762, for example, may be a Liquid Crystal Display (LCD) or an Active Matrix-Organic Light Emitting Diode (AM-OLED). The panel 762, for example, may be flexible, transparent, or wearable. The panel 762 may also be incorporated together with the touch panel 752 within a single panel. The hologram unit 764 shows a stereoscopic image in the air by using light interference. The projector 766 displays an image by projecting light onto a screen. The screen, for example, may be located inside or outside of the electronic device 700. According to an embodiment of the present invention, the display 760 may further include a control circuit for controlling the panel 762, the hologram unit 764, or the projector 766.

The interface 770, for example, may include a High-Definition Multimedia Interface (HDMI) 772, a Universal Serial Bus (USB) 774, an optical interface 776, or a D-subminiature (D-sub) 778. The interface 770, for example, may be included in the communication interface 160 shown in FIG. 1. Additionally or alternatively, the interface 790 may include, for example, a Mobile High-definition Link (MHL) interface, a Secure Digital (SD) card/MultiMedia Card (MMC) interface, or an Infrared Data Association (IrDA) interface.

The audio module 780 provides bidirectional conversion between a sound and an electronic signal. At least some elements of the audio module 780, for example, may be included in the input/output interface 140 shown in FIG. 1. The audio module 780, for example, may process sound information input or output through a speaker 782, a receiver 784, earphones 786, or the microphone 788.

The camera module 791 is a device that can take both still and moving images, and according to an embodiment of the present invention, may include one or more image sensors (e.g., a front sensor or a rear sensor, not shown), a lens (not shown), an Image Signal Processor (ISP) (not shown), or a flash (e.g., a Light-Emitting Diode (LED) or xenon lamp, not shown).

The power management module 795 may manage power of the electronic device 700. Although not shown, the power management module 795, for example, may include a Power Management Integrated Circuit (PMIC), a charger IC, or a battery or fuel gauge.

The PMIC, for example, may be mounted in an IC or an SoC semiconductor. Charging methods include wired charging and wireless charging. The charger IC may charge a battery, and may prevent an overvoltage or excess current from being induced or flowing from a charger. According to an embodiment of the present invention, the charger IC includes a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added in order to perform the wireless charging.

The battery gauge, for example, may measure the residual capacity, charge in voltage, current, or temperature of the battery 796. The battery 796 stores or generates electricity and supplies power to the electronic device 700 by using the stored or generated electricity. The battery 796, for example, may include (not shown) a rechargeable battery or a solar battery.

The indicator 797 displays a specific status of the electronic device 700 or a part thereof (e.g., the AP 710), for example, a boot-up status, a message status, or a charging status. The motor 798 convert an electrical signal into a mechanical vibration. Although not shown, the electronic device 700 may include a processing unit (e.g., a GPU) for supporting a mobile TV. The processing unit for supporting a mobile TV may process media data pursuant to a certain standard, for example, Digital Multimedia Broadcasting (DMB), Digital Video Broadcasting (DVB), or media flow.

Each of the above described elements of the electronic device according to embodiments of the present invention may be formed by one or more components, and the names of the corresponding elements may vary according to the type of the electronic device. An electronic device according to embodiments of the present invention may include one or more of the above described elements while excluding some of the other elements, or may further include other additional elements. Further, some of the elements of the electronic device according to embodiments of the present invention may be coupled to form a single entity while performing the same functions as those of the corresponding elements separately.

Figure 8:
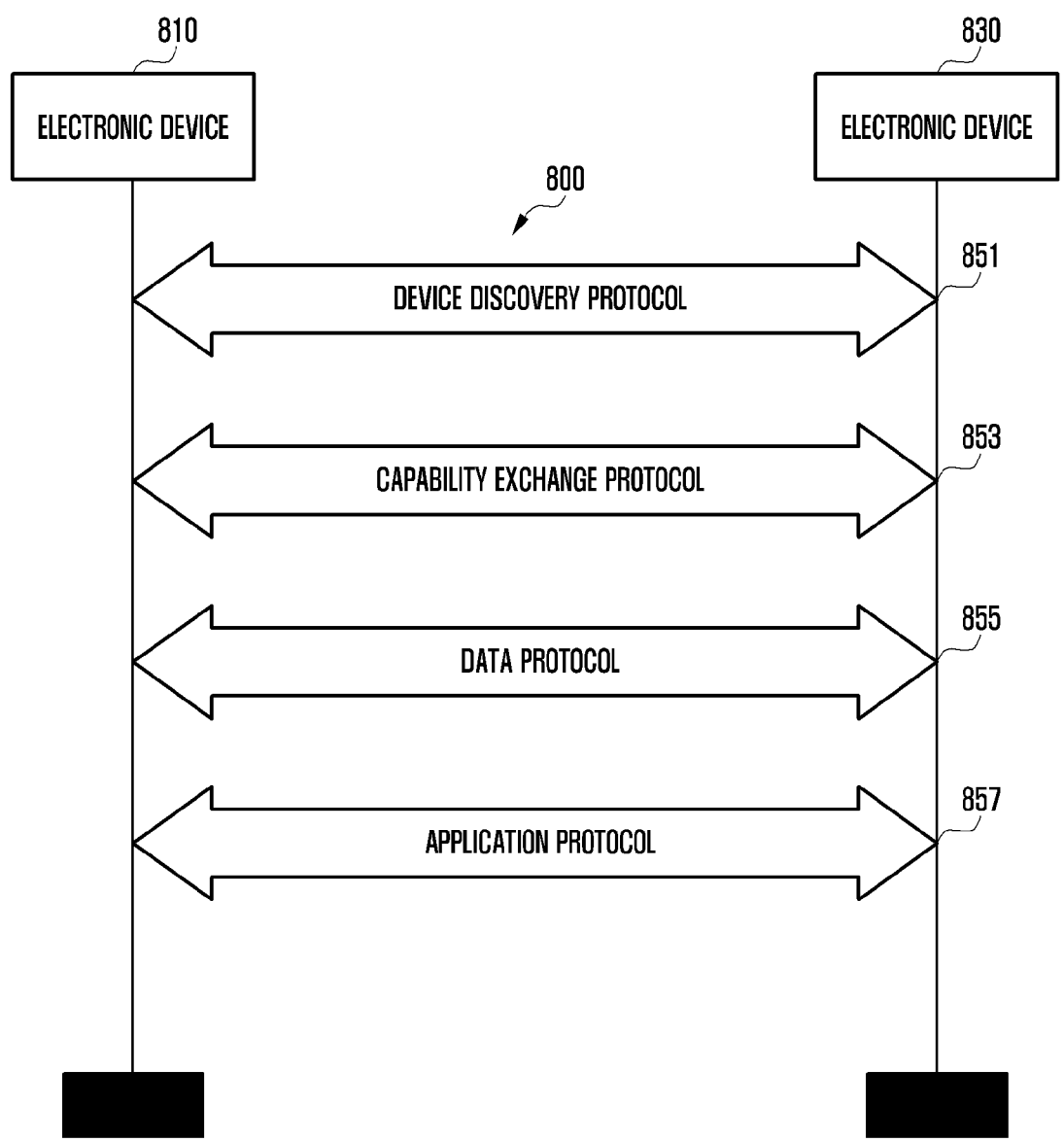
FIG. 8 is a diagram illustrating a communication protocol between a plurality of electronic devices according to an embodiment of the present invention.

FIG. 8 is a diagram illustrating a communication protocol between a plurality of electronic devices according to an embodiment of the present invention.

Referring to FIG. 8, the plurality of electronic devices includes a first electronic device 810 and a second electronic device 830. A communication protocol 800 between the first and second electronic devices 810 and 830 include a device discovery protocol 851, a capability exchange protocol 853, a data protocol 855, an application protocol 857, etc.

According to an embodiment of the present invention, the device discovery protocol 851 is for detecting an external electronic device that can communicate with an electronic device (e.g., that can communicate with one of the first electronic device 810 and the second electronic device 830), or a protocol for connecting the external electronic device to the electronic device. For example, the first electronic device 810 (e.g., the electronic device 101 of FIG. 1) detects the second electronic device 830 (e.g., the electronic device 104) as a device than can communicate with the first electronic device 810, through a communication protocol (e.g, WiFi, BT or USB) usable by the first electronic device 810. In order to establish a communication connection with the second electronic device 830, the first electronic device 810 acquires identification information of the second electronic device 830 detected through the device discovery protocol 851 and stores the acquired identification information. The first electronic device 810 establishes the communication connection with the second electronic device 830 based on the identification information.

According to an embodiment of the present invention, the device discovery protocol 851 is used for a mutual authentication among a plurality of electronic devices. For example, the first electronic device 810 performs an authentication between the first electronic device 810 and the second electronic device 830 based on communication information (for example, a Media Access Control (MAC) address, a Universally Unique IDentifier (UUID), a SubSystem IDentification (SSID), and an Information Provider (IP) address) for the connection with the second electronic device 830.

According to an embodiment of the present invention, the capability exchange protocol 853 is used for exchanging information related to a service function that is supported by at least one of the first electronic device 810 and the second electronic device 830. For example, the first electronic device 810 or the second electronic device 830 exchange information related to a service function currently provided by each of the first electronic device 810 and the second electronic device 830 through the capability exchange protocol 853. The exchangeable information includes identification information indicating a particular service among a plurality of services that can be supported by the first electronic device 810 or the second electronic device 830. For example, the first electronic device 810 may receive, from the second electronic device 830, identification information of a particular service provided by the first electronic device 830 through the capability exchange protocol 853. In this case, the first electronic device 810 determines whether the particular service can be supported by the electronic device 810 itself based on the received identification information.

According to an embodiment of the present invention, the data protocol 855 is used for controlling a flow of data that is transmitted and received to provide in association with a service between electronic devices (e.g, the first electronic device 810 and the second electronic device 830) that are connected in order to communicate with each other. For example, at least one of the first electronic device 810 and the second electronic device 830 may control an error or data quality by using the data protocol 855. Additionally or alternatively, the data protocol 855 may determine a transmission format of the data that is transmitted and received between the first electronic device 810 and the second electronic device 830. In addition, at least one of the first electronic device 810 and the second electronic device 830 may manage (e.g., a session connection or a session ending) a session for a mutual data exchange using the data protocol 855.

According to an embodiment of the present invention, the application protocol 857 is used for providing a process or information for exchanging data related to a service provided to an external electronic device. For example, the first electronic device 810 (e.g., the electronic device 101 of FIG. 1) provides a service to the second electronic device 830 (e.g., the electronic device 104 or a server 106) through the application protocol 857.

According to an embodiment of the present invention, the communication protocol 800 includes a standard communication protocol, a communication protocol designated by an individual or organization (e.g., a communication protocol self-designated by a communication device manufacturing company or a network supplying company) or a combination thereof.

The term "module" as used herein, may refer to a unit including any of hardware, software, and firmware or any combination thereof. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module", according to the embodiments of the present invention, may include at least one of an Application-Specific Integrated Circuit (ASIC) chip, a Field-Programmable Gate Arrays (FPGA), and a programmable-logic device for performing certain operations, including those that are currently-known as well as those that may be developed in the future.

According to an embodiment of the present invention, at least part of a device (e.g., modules or functions thereof) or a method (for example, operations) may be embodied by, for example, an instruction stored in a computer readable storage medium provided in a form of a programming module. When the instruction is performed by at least one processor (for example, the processor 120), the at least one processor performs a function corresponding to the instruction. The computer-readable storage medium may be, for example, the memory 130. At least some of the programming modules may be implemented (e.g., executed) by the processor 120. At least a part of the programming module may include, for example, a module, a program, a routine, a set of instructions and/or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory, etc. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present invention, and vice versa.

A module or a programming module according to embodiments of the present invention may include at least one of the component elements described herein, a few of the component elements may be omitted, or additional component elements may be included. Operations executed by a module, a programming module, or other component elements according to various embodiments of the present invention may be executed sequentially, in parallel, repeatedly, or in a heuristic manner. Further, some operations may be executed in a different order, operations may be omitted, or other operations may be added.

According to embodiments of the present invention, in a recording medium storing instructions, when the instructions are executed by at least one processor, the instructions are set to perform at least one of operations by at least one of processors. At least one of the operations may include an operation of monitoring a generation of an event satisfying a predetermined condition, an operation of selecting other electronic device when the generation of the event satisfying the predetermined condition is detected, and an operation of generating task environment information of an application and to transmit the task environment information to the other selected electronic device.

Descriptions of embodiments of the present invention described herein are merely examples used to describe the technology associated with embodiments of the present invention and to help provide an understanding of the embodiments of the present invention, but do not limit the scope of the embodiments of the present invention. Therefore, in addition to the embodiments described herein, the scope of the various embodiments of the present invention include all modifications or modified forms drawn based on the technical ideas of the embodiments of the present invention.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of linking a task of an electronic device, the method comprising:
   determining whether generation of an event satisfying a predetermined condition is detected;
   selecting another electronic device that is linkable to the electronic device when the generation of the event satisfying the predetermined condition is detected; and
   generating task environment information of an application and transmitting the task environment information to the other selected electronic device,
   wherein the task environment information of the application comprises a context information of the application,
   wherein the other selected electronic device restores the task environment of the corresponding application using the received context information to execute the corresponding application,
   wherein the other selected electronic device parses the received context information to determine whether the application exists in both the electronic device and the other selected electronic device,
   wherein, when the application exists in both the electronic device and the other selected electronic device, the other selected electronic device executes the application, and
   wherein when the application does not exist in both the electronic device and the other selected electronic device, the other selected electronic device links to an application having a same function or a similar category of function as a function of the application.

2. The method of claim 1, wherein the generation of the event satisfying the predetermined condition includes at least one of a generation of a predetermined event, a reception of an input instructing a task link by a user, and a generation of resource shortage state.

3. The method of claim 2, wherein selecting the other electronic device comprises:
   searching for at least one other electronic device that is connected to the electronic device through a network, when the resource shortage state is detected;
   transmitting resource shortage information to the at least one other searched electronic device; and
   receiving resource state information corresponding to the resource shortage information from the at least one other searched electronic device.

4. The method of claim 3, wherein selecting the other electronic device further comprises comparing the received resource state information with monitored resource state information of the electronic device to determine which of the electronic device and the at least one other electronic device has superior resource state information.

5. The method of claim 4, wherein selecting the other electronic device comprises selecting an electronic device having the most superior resource state information from among the at least one other electronic device.

6. The method of claim 1, wherein selecting the other electronic device comprises selecting an electronic device that has been designated by the electronic device as a reliable electronic device.

7. The method of claim 1, wherein selecting the other electronic device further comprises setting a selection priority based on at least one of a task link history and resource statistics information of a plurality of other electronic devices capable of performing a task link with the electronic device.

8. The method of claim 1, further comprising:
   searching for an electronic device to be paired with the electronic device;
   requesting a pairing between the electronic device and the searched electronic device; and
   storing device information of the searched electronic device, when the searched electronic device accepts the pairing request.

9. The method of claim 8, wherein selecting the other electronic device comprises selecting the paired electronic device.

10. The method of claim 1, further comprising:
    monitoring a state of resources of the electronic device with respect to an application executed by the electronic device.

11. The method of claim 10, wherein the state of the resources includes at least one of a battery state, an amount of data usage with respect to a data usage agreement, a telephone signal strength, a network connection state, a remaining memory capacity, a processor speed, a state of a voice signal output device, a state of a screen size, and a state of a usable auxiliary device.

12. An electronic device comprising:
    a task link control module configured to determine whether generation of an event satisfying a predetermined condition is detected, select another electronic device that is linkable to the electronic device through a communication interface, when the generation of the event satisfying the predetermined condition is detected, generate task environment information of an application, and transmit the task environment information to the other selected electronic device through the communication interface; and
    the communication interface configured to perform communication with the another electronic device,
    wherein the task environment information of the application comprise a context information of the application,
    wherein the other selected electronic device restores the task environment of the corresponding application using the received context information to execute the corresponding application,
    wherein the selected other electronic device parses the received context information to determine whether the application exists in both the electronic device and the selected other electronic device,
    wherein, when the application exists in both the electronic device and the selected other electronic device, the selected other electronic device executes the application, and
    wherein when the application does not exist in both the electronic device and the other selected electronic device, the other selected electronic device link to an application having a same function or a similar category of function as a function of the application.

13. The electronic device of claim 12, wherein the task link control module selects the other electronic device through the communication interface when the task link control module detects at least one of a generation of a predetermined event, a reception of an input instructing a task link by a user, and a generation of resource shortage state.

14. The electronic device of claim 13, wherein the task link control module controls searching for at least one other electronic device that is connected to the electronic device through the communication interface when the resource shortage state is detected, transmitting resource shortage information to the at least one other searched electronic device, and receive resource state information corresponding to the resource shortage information from the at least one other searched electronic device.

15. The electronic device of claim 14, wherein the task link control module compares the received resource state information with monitored resource state information of the electronic device to which of the electronic device and the at least one other electronic device has superior resource state information, and when the received resource state information of at least one of the searched at least one other electronic device is superior to the monitored resource state information of the electronic device, selects an electronic device from among the searched at least one electronic device having the most superior resource state information.

16. The electronic device of claim 12, wherein the task link control module selects an electronic device that has been designated by the electronic device as a reliable electronic device.

17. The electronic device of claim 12, wherein the task link control module sets a selection priority based on at least one of a task link history and resource statistics information of a plurality of other electronic devices capable of a task link with the electronic device.

18. The electronic device of claim 12, wherein the task link control module searches for an electronic device to be paired with the electronic device, requests a pairing between the electronic device the searched electronic device, when the searched electronic device accepts the pairing request, controls to store device information of the searched electronic device in a memory, and when the generation of the event satisfying the predetermined condition is detected, selects the paired electronic device.

19. The electronic device of claim 13, wherein a state of resources of the electronic device includes at least one of a battery state, an amount of data usage with respect to a data usage agreement, a telephone signal strength, a network connection state, a remaining memory capacity, a processor speed, a state of a voice signal output device, a state of a screen size, and a state of a usable auxiliary device.

20. A non-transitory computer-readable recording medium having recorded thereon a program for executing a method of linking a task of an electronic device, the method comprising:
  determining whether a generation of an event satisfying a predetermined condition is detected;
  selecting another electronic device that is linkable to the electronic device when the generation of the event satisfying the predetermined condition is detected; and
  generating task environment information of an application and to transmit the task environment information to the other selected electronic device,
  wherein the task environment information of the application comprise a context information of the application,
  wherein the other selected electronic device restores the task environment of the corresponding application using the received context information to execute the corresponding application,
  wherein the selected other electronic device parses the received context information to determine whether the application exists in both the electronic device and the selected other electronic device,
  wherein, when the application exists in both the electronic device and the selected other electronic device, the selected other electronic device executes the application, and
  wherein when the application does not exist in both the electronic device and the other selected electronic device, the other selected electronic device link to an application having a same function or a similar category of function as a function of the application.

* * * * *